United States Patent [19]
Krikorian

[11] 3,928,549
[45] Dec. 23, 1975

[54] THERMOCHEMICAL PRODUCTION OF HYDROGEN

[75] Inventor: Oscar H. Krikorian, Danville, Calif.

[73] Assignee: The United States of America as represented by the United States Energy Research and Development Administration, Washington, D.C.

[22] Filed: June 20, 1974

[21] Appl. No.: 481,263

[52] U.S. Cl. .................................. 423/648; 423/579
[51] Int. Cl.² .......................................... C01B 1/02
[58] Field of Search ............ 423/579, 509, 510, 648, 423/617, 557, 604

[56] References Cited
UNITED STATES PATENTS

| | | | |
|---|---|---|---|
| 1,415,526 | 5/1922 | Chikashige | 423/510 |
| 2,155,119 | 4/1939 | Ebner | 423/604 |
| 2,281,762 | 5/1942 | Grace | 423/579 |
| 2,322,348 | 6/1943 | Clark | 423/509 |
| 2,835,558 | 5/1958 | Vaaler | 423/510 |
| 3,127,244 | 3/1964 | Elkin et al. | 423/510 |
| 3,130,012 | 4/1964 | Prater et al. | 423/510 |
| 3,239,306 | 3/1966 | Reusser et al. | 423/509 |

*Primary Examiner*—Oscar R. Vertiz
*Assistant Examiner*—Wayne A. Langel
*Attorney, Agent, or Firm*—Dean E. Carlson; Frederick A. Robertson; Irene S. Croft

[57] ABSTRACT

A closed cycle reaction sequence for the thermochemical production of hydrogen utilizing, as an intermediate, a metalloidal element from Group V or Group VI of the periodic system, specifically, an element from the arsenic-antimony-bismuth subgroup of Group V or the selenium-tellurim subgroup of Group VI, and the compounds thereof. The closed cycle process comprises the steps of: (1) hydrolyzing an intermetallic compound of a metal, preferably an alkali or alkaline earth metal, and a metalloidal element of the type described, thereby producing an oxide or hydroxide of the metal, hydrogen, and the metalloidal element, or a compound which readily yields hydrogen and the metalloidal element;; (2) reacting the metalloidal element with the metal oxide or hydroxide, thereby regenerating the intermetallic compound and producing a marginally stable oxide of the metalloidal element; (3) reducing the oxide of the metalloidal element with a reducing agent which can be regenerated by thermal decomposition, thereby regenerating the metalloidal element and oxidizing the reducing agent; and (4) decomposing the oxidized reducing agent, thereby regenerating the reducing agent and producing oxygen. The net reaction of the foregoing sequence is the decomposition of water into hydrogen and oxygen.

11 Claims, No Drawings

THERMOCHEMICAL PRODUCTION OF HYDROGEN

BACKGROUND OF THE INVENTION

The invention described herein was made in the course of, or under, Contract No. W-7405-ENG-48 with the United States Atomic Energy Commission.

This invention relates to the production of hydrogen utilizing a sequence of reactions in a closed cycle thermochemical process.

The potential use of hydrogen as a non-polluting energy source is well known. However, for hydrogen ever to achieve large-scale use, there must be large-scale production. The main problem is finding thermodynamically efficient methods for producing cheap hydrogen. The most obvious method, electrolysis of water, is relatively inefficient when one considers that the method is primarily dependent upon and limited by the efficiency of generating the electrical energy for the electrolysis. Direct thermal cracking of gaseous water using nuclear heat has been virtually discarded for thermodynamic reasons. No appreciable yields are possible under 2,500°C, and present conventional reactors are not able to provide such temperatures during normal operation.

Multistep processes for the production of hydrogen from water have been suggested. If suitable reagents for a sequence can be found, it is possible to minimize the work requirement and chemically produce hydrogen and oxygen from water without electrolysis. The difficulty is finding a suitable set of reagents.

One reaction sequence, based on calcium, bromine and mercury compounds, has recently been proposed for the production of hydrogen and oxygen from water at temperatures under 730°C. (See "Hydrogen Fuel Use Calls for New Source," *Chemical and Engineering News*, July 3, 1972, pp. 16–18.) The process consumes none of the materials required for the sequence; the net reaction is simply decomposition of water. However, one of the major problems associated with this reaction sequence is the formation of such compounds as HBr, the extremely corrosive effects of which at high temperatures and pressures are well known.

It is, therefore, among the objects of this invention to provide a closed cycle reaction sequence for the thermochemical production of hydrogen wherein the net reaction is the decomposition of water.

SUMMARY OF THE INVENTION

In accordance with the invention there is provided a closed cycle reaction sequence for the thermochemical production of hydrogen utilizing, as an intermediate, a metalloidal element from Group V or Group VI of the periodic system and the compounds thereof. Certain elements of the periodic system possess the characteristics of both metals and non-metals. Such elements, termed semi-metals or metalloids, are described in "The Metalloids," by Eugene G. Rochow, D. C. Heath & Co., 1966. (A list of those elements which can be considered to be metalloids is given on page 8 of the cited reference.) The present invention utilizes those metalloidal elements of Group V and Group VI, namely, the elements of the arsenic-antimony-bismuth subgroup of Group V and the selenium-tellurium subgroup of Group VI. These elements have in common the property of forming an oxide having only marginal stability, yet they are capable of forming intermetallics or compounds having significant stabilities with one or more metals.

The closed cycle process of the present invention comprises the steps of: (1) hydrolyzing an intermetallic compound of a metal, preferably an alkali or alkaline earth metal, and a metalloidal element as described above, thereby producing an oxide or hydroxide of the metal, hydrogen, and the metalloidal element, or a compound which can readily be converted to hydrogen and the metalloidal element; (2) reacting the metalloidal element with the metal oxide or hydroxide to regenerate the intermetallic compound and produce a marginally stable oxide of the metalloidal element; (3) reducing the oxide of the metalloidal element with a reducing agent which is capable of being regenerated by thermal means, thereby regenerating the metalloidal element and oxidizing the reducing agent; and (4) decomposing the oxidized reducing agent, thereby regenerating the reducing agent and producing oxygen. The net reaction of the foregoing sequence is the decomposition of water into hydrogen and oxygen.

In a preferred embodiment of the invention, alkali metal or alkaline earth metal compound of a metalloidal element from the selenium-tellurium subgroup of Group VI is utilized as the intermetallic compound, with hydrolysis of the intermetallic yielding hydrogen selenide or telluride which can readily be decomposed to produce hydrogen.

Hydroylsis of the intermetallic compound, or, more specifically, the interaction of the intermetallic compound with hydrogen ion, can be accomplished by reaction with water, steam or an aqueous acidic medium. If water or steam is employed as the hydrolyzing agent, the metal oxide or hydroxide is formed directly. However, if an aqueous acidic solution is used, a metal salt is formed, and it is necessary to introduce intermediate reaction steps to regenerate the acid and form the metal oxide or hydroxide. Certain oxyacids, such as sulfuric acid, yield metal salts which can be converted to the corresponding oxide by thermal decomposition. For example, the use of sulfuric acid results in the formation of a metal sulfate which can be decomposed to yield the corresponding metal oxide, sulfur dioxide, and oxygen. The product sulfur dioxide can then be utilized for the purpose of reducing the oxide of the metalloidal element in accordance with step (3) of the reaction sequence as described above, sulfuric acid being thereby regenerated for re-use in the hydrolysis reaction.

Any thermally regenerable reducing agent can be employed for the reduction reaction described in step (3) of the above-described reaction sequence. Particularly suitable reducing agents are the inorganic oxides of those elements which are capable of combining with oxygen to form at least two different oxides, the oxide of the element in its lower oxidation state being the reducing agent. Such reducing oxides combine with additional oxygen to produce an oxide of the element in its higher oxidation state. Numerous such reducing agents are known in the art, for example, $SO_2$, $Mn_3O_4$, $BiO$, $Ce_2O_3$, $Cu_2O$, $Fe_3O_4$, $V_2O_4$, $As_2O_3$, and the like, which become oxidized to the thermally decomposable compounds $SO_3$, $MnO_2$, $Bi_2O_3$, $CeO_2$, $CuO$, $Fe_2O_3$, $V_2O_5$, $As_2O_5$, respectively. Other thermally regenerable reducing agents include, for example, silver which becomes oxidized to $Ag_2O$ which can be thermally decomposed to regenerate silver and produce oxygen.

Since the reaction sequence of the present invention represents a closed cycle, the process can be initiated at any point of the sequence. For example, the process may be initiated by using a metalloidal element to convert a metal oxide or hydroxide to an intermetallic compound and to produce a marginally stable oxide of the metalloidal element as described in step (2) above. Various other modifications and changes will be obvious to those skilled in the art without departing from the spirit and scope of the invention as described herein.

DETAILED DESCRIPTION OF THE INVENTION

The present invention will be described in detail with reference to specific examples.

EXAMPLE 1

The following sequence of reactions illustrates a closed cycle process for the thermochemical production of hydrogen utilizing potassium selenide as an intermediate.

$$K_2Se + 2H_2O \rightarrow 2KOH + H_2Se \sim 100°C \quad (1)$$
$$H_2Se \rightarrow H_2 + Se \sim 200°C$$
$$3/2\,Se + 2\,KOH \rightarrow K_2Se + \tfrac{1}{2}SeO_2 + H_2O \sim 700°C \quad (2)$$
$$V_2O_4 + \tfrac{1}{2}SeO_2 \rightarrow V_2O_5 + \tfrac{1}{2}Se \sim 325°C \quad (3)$$
$$V_2O_5 \rightarrow V_2O_4 + \tfrac{1}{2}O_2 \sim 500°C \quad (4)$$

Net reaction:
$$H_2O \rightarrow H_2 + \tfrac{1}{2}O_2$$

EXAMPLE 2

The following sequence of reactions is another illustration of a closed cycle process utilizing potassium selenide as an intermediate as in Example 1, but using arsenic trioxide as the reducing agent.

$$K_2Se + 2H_2O \rightarrow 2KOH + H_2Se \sim 100°C \quad (1)$$
$$H_2Se \rightarrow H_2 + Se \sim 200°C$$
$$3/2\,Se + 2KOH \rightarrow K_2Se + \tfrac{1}{2}SeO_2 + H_2O \sim 700°C \quad (2)$$
$$\tfrac{1}{2}As_2O_3 + \tfrac{1}{2}SeO_2 \rightarrow \tfrac{1}{2}As_2O_5 + \tfrac{1}{2}Se \sim 200°C \quad (3)$$
$$\tfrac{1}{2}As_2O_5 \rightarrow \tfrac{1}{2}As_2O_3 + \tfrac{1}{2}O_2 \sim 700°C \quad (4)$$

Net reaction:
$$H_2O \rightarrow H_2 + \tfrac{1}{2}O_2$$

EXAMPLE 3

The following sequence of reactions is similar to that of Example 1, except that sulfur dioxide is utilized as the thermally regenerable reducing agent.

$$K_2Se + 2H_2O \rightarrow 2KOH + H_2Se \sim 100°C \quad (1)$$
$$H_2Se \rightarrow H_2 + Se \sim 200°C$$
$$3/2\,Se + 2KOH \rightarrow K_2Se + \tfrac{1}{2}SeO_2 + H_2O \sim 700°C \quad (2)$$
$$\tfrac{1}{2}SeO_2 + H_2O + SO_2 \rightarrow \tfrac{1}{2}Se + H_2SO_4 \sim 25°C \quad (3)$$
$$H_2SO_4 \rightarrow SO_3 + H_2O \sim 200°C \quad (4)$$
$$SO_3 \rightarrow SO_2 + \tfrac{1}{2}O_2 \sim 700°C$$

Net reaction:
$$H_2O \rightarrow H_2 + \tfrac{1}{2}O_2$$

In the above sequence of reactions, the thermal decomposition of $SO_3$ to $SO_2$ could be promoted by removal of $O_2$ at temperature, thereby driving the reaction essentially to completion at temperatures lower than the approximately 700°C indicated. One possible method of oxygen removal comprises the use of a defect oxide, such as calcia or yttria-stabilized zirconia, as filter to allow oxygen to diffuse out from the reaction vessel into a vacuum or other region of low oxygen concentration.

In some cases, it may be desirable to carry out the hydrolysis reaction in the presence of an aqueous acidic medium. However, in order to maintain a closed cycle process, it is necessary to regenerate the acid. One method of regenerating an acid in a closed reaction cycle involves the use of an ion-exchange resin as described and claimed in copending application Ser. No. 481,300, of Robert M. Dreyfuss filed concurrently herewith.

EXAMPLE 4

The following example illustrates a closed cycle process wherein hydrolysis is carried out in an aqueous acidic medium as described above. The symbol Ac is used to indicate the acetate anion.

$$K_2Se + 2HAc \rightarrow 2KAc + H_2Se \sim 25°C \quad (1a)$$
$$2KAc + 2NH_4^+{}_{(resin)} \rightarrow 2NH_4Ac + 2K^+\,(resin) \sim 25°C \quad (1b)$$
$$2NH_4Ac \rightarrow 2NH_3 + 2HAc \sim 165°C \quad (1c)$$
$$2H_2O + 2NH_3 \rightarrow 2NH_4^+ + 2OH^- \sim 25°C \quad (1d)$$
$$2NH_4^+ + 2K^+(resin) \rightarrow 2NH_4^+{}_{(resin)} + 2K^+ \sim 25°C \quad (1e)$$
$$\text{Sum: } K_2Se + 2H_2O \rightarrow 2KOH + H_2Se \quad (1)$$

The net reaction of the above sequence corresponds to the hydrolysis reaction (1) described in the previous Examples 1, 2, and 3. The process cycle can then be continued for the production of hydrogen as outlined in the previous examples.

EXAMPLE 5

The following example illustrates the use of magnesium selenide as the intermediate in accordance with the closed cycle process of the present invention.

$$\tfrac{1}{2}MgSe + H_2O\,(steam) \rightarrow \tfrac{1}{2}Mg(OH)_2 + \tfrac{1}{2}H_2Se \sim 190°C \quad (1)$$
$$3/2\,H_2Se \rightarrow 3/2\,H_2 + 3/2\,Se \sim 200°C \quad (1)$$
$$2Se + Mg(OH)_2 \rightarrow H_2Se + \tfrac{1}{2}MgSe + \tfrac{1}{2}MgSeO_4 \sim 225°C \quad (3)$$
$$\tfrac{1}{2}MgSeO_4 \rightarrow \tfrac{1}{2}MgO + \tfrac{1}{2}SeO_2 + \tfrac{1}{4}O_2 \sim 700°C \quad (4)$$
$$\tfrac{1}{2}MgO + \tfrac{1}{2}H_2O \rightarrow \tfrac{1}{2}Mg(OH)_2 \sim 200°C$$

The selenium dioxide produced in reaction (4) can be reduced in accordance with reaction steps (3) and (4) described and illustrated in previous Examples 1, 2, and 3, in order to complete the cycle.

EXAMPLE 6

The following sequence illustrates the use of copper selenide as the intermediate in the present reaction cycle.

$$CuSe + H_2SO_4 \rightarrow CuSO_4 + H_2Se \sim 100°C \quad (1)$$
$$H_2Se \rightarrow H_2 + Se \sim 200°C$$
$$CuSO_4 \rightarrow CuO + SO_2 + \tfrac{1}{2}O_2 \sim 800°C \quad (2)$$
$$CuO + 3/2\,Se \rightarrow CuSe + \tfrac{1}{2}SeO_2 \sim 400°C \text{ to } \sim 800°C \quad (3)$$
$$\tfrac{1}{2}SeO_2 + \tfrac{1}{2}H_2O \rightarrow \tfrac{1}{2}H_2SeO_3 \quad (4)$$
$$\tfrac{1}{2}H_2SeO_3 + SO_2 + \tfrac{1}{2}H_2O \rightarrow \tfrac{1}{2}Se + H_2SO_4 \sim 25°C$$

Net reaction:
$$H_2O \rightarrow H_2 + \tfrac{1}{2}O_2$$

In the above reaction sequence, the reducing agent, sulfur dioxide, is regenerated in a decomposition step wherein the sulfuric acid produced in reaction (4) is utilized as the hydrolyzing agent. In reaction (3) above, the reduction of CuO with liquid Se may be conveniently carried out by a liquid extraction process in which Se dissolves oxygen from the CuO and then separates out as a liquid $SeO_2$ layer. The liquid $SeO_2$ may then be drained off and additional liquid Se added as needed to carry the reaction to completion. The advantage of this process step is the ease with which the $SeO_2$ product can be separated.

From an economic and environmental standpoint, a closed process cycle is decidedly advantageous; the by-products of the reactions are recycled for reuse so that raw materials are not wasted, nor are any waste materials produced to pollute the environment. Another advantage of the present closed cycle process is that operational temperatures are limited to substantially 800°C, and, in the case of alkali metal and alkaline earth metal selenides, to even lower temperatures, substantially 700°C. In addition to the foregoing, corrosive substances are avoided in the process of the present invention.

The closed cycle processes of the present invention are also suitable candidates for use as thermochemical topping cycles. A topping cycle is secondary energy conversion system capable of operating between the source temperatures and the input temperatures to a conventional power system. The magnesium selenide reaction cycle described in Example 4 above is particularly suitable for use as a topping cycle since all of the reactions of the cycle can be carried out at about 200°C or higher.

Although the invention has been described in detail with respect to specific examples, it will be appreciated that various changes and modifications can be made by those skilled in the art within the scope of the invention as expressed in the following claims.

What I claim is:

1. A closed cycle process for the thermochemical production of hydrogen from water which comprises:
   a. hydrolyzing a hydrolyzable compound of a metal and a metalloidal element selected from the group consisting of arsenic, antimony, bismuth, selenium, and tellurium, thereby producing the corresponding metal oxide or hydroxide and a compound of hydrogen and the metalloidal element;
   b. thermally decomposing the compound of hydrogen and the metalloidal element, thereby producing hydrogen and the metalloidal element;
   c. reacting the metalloidal element with the metal oxide or hydroxide, thereby regenerating the compound of the metal and the metalloidal element and producing an oxide of the metalloidal element;
   d. reducing the oxide of the metalloidal element with a thermally regenerable reducing agent, thereby regenerating the metalloidal element and oxidizing the reducing agent; and
   e. thermally decomposing the oxidized reducing agent, thereby regenerating the reducing agent and producing oxygen.

2. A process according to claim 1 wherein the metal is an alkali metal or an alkaline earth metal.

3. A process according to claim 2 wherein the metalloidal element is selected from the group consisting of selenium and tellurium.

4. A process according to claim 3 wherein the compound of a metal and a metalloidal element is potassium selenide.

5. A process according to claim 3 wherein the compound of a metal and a metalloidal element is magnesium selenide.

6. A process according to claim 1 wherein the thermally regenerable reducing agent is an inorganic oxide.

7. A process according to claim 6 wherein the thermally regenerable reducing agent is sulfur dioxide.

8. A process according to claim 1 wherein the net reaction is the decomposition of water into hydrogen and oxygen.

9. A process according to claim 1 wherein the metalloidal element is selected from the group consisting of selenium and tellurium.

10. A process according to claim 1 wherein the metal is copper.

11. A closed cycle process for the thermochemical production of hydrogen which comprises:
    a. reacting copper selenide with sulfuric acid, thereby producing copper sulfate, hydrogen, and selenium;
    b. thermally decomposing the copper sulfate, thereby producing copper oxide, sulfur dioxide, and oxygen;
    c. reacting the copper oxide with selenium, thereby regenerating the copper selenide and producing selenium dioxide; and
    d. reducing the selenium dioxide with sulfur dioxide in aqueous solution, thereby producing selenium and regenerating sulfuric acid.

* * * * *